United States Patent
Winter et al.

[11] Patent Number: 6,152,723
[45] Date of Patent: Nov. 28, 2000

[54] BLOW MOULDING MACHINE

[75] Inventors: Horst Winter, Neutraubling; Karl Griesbeck, Regensburg, both of Germany

[73] Assignee: Krones AG, Neutraubling, Germany

[21] Appl. No.: 09/171,315

[22] PCT Filed: Feb. 16, 1998

[86] PCT No.: PCT/EP98/00868

§ 371 Date: Jan. 25, 1999

§ 102(e) Date: Jan. 25, 1999

[87] PCT Pub. No.: WO98/35815

PCT Pub. Date: Aug. 20, 1998

[30] Foreign Application Priority Data

Feb. 17, 1997 [DE] Germany .......................... 197 06 182
Jun. 27, 1997 [DE] Germany .......................... 197 27 278

[51] Int. Cl.[7] .......................... B29C 49/36; B29C 49/64
[52] U.S. Cl. .......................... 425/526; 425/534; 425/540
[58] Field of Search .................. 425/526, 534, 425/540

[56] References Cited

U.S. PATENT DOCUMENTS

| | | | |
|---|---|---|---|
| 3,453,353 | 7/1969 | Ninneman | 425/526 |
| 3,599,280 | 8/1971 | Rosenkranz | 425/540 |
| 4,046,498 | 9/1977 | Appel et al. | 425/526 |
| 4,589,837 | 5/1986 | Di Settembrini | 425/522 |
| 4,846,663 | 7/1989 | Just-Hanig | 425/534 |

FOREIGN PATENT DOCUMENTS

| | | |
|---|---|---|
| 2700293 | 7/1994 | France . |
| 2 630 965 | 9/1994 | France . |
| 2742693 | 4/1979 | Germany . |
| 47-16558 | 5/1972 | Japan ..................... 425/540 |
| 2038699 | 7/1980 | United Kingdom . |
| 2074496 | 11/1981 | United Kingdom . |

*Primary Examiner*—Robert Davis
*Attorney, Agent, or Firm*—Tilton, Fallon, Lungmus & Chestnut

[57] ABSTRACT

A blow moulding machine comprising a heating wheel provided with a plurality of reception means for preforms and having a substantially vertical axis of rotation, and a blow wheel provided with a plurality of blow stations for hollow bodies such as for bottles, and having a substantially vertical axis of rotation. The heating wheel and the blow wheel are arranged on different levels and overlap each other at least partially. The preforms are moved from the level of the heating wheel to the level of the blow wheel by means of a transfer device. A substantial reduction of the floor space and of the production costs for the blow moulding machine is achieved in this way.

34 Claims, 8 Drawing Sheets

BLOW MOULDING MACHINE

FIELD OF THE INVENTION

The present invention refers to a blow moulding machine for forming hollow bodies such as bottles.

BACKGROUND OF THE INVENTION

Such blow moulding machines are known in various embodiments, the preforms and the finished hollow bodies, such as bottles, being transported directly (GB 2 074496 A) or indirectly (DE 27 42 693 C2) with the aid of loose mandrels. In any case, the heating wheel and the blow wheel rotate side by side in a common horizontal plane; if necessary, an intermediate transfer device is used for the heated preforms. This inevitably results in a structural design occupying a large floor space and taking up much room. The integration of a known blow moulding machine in a filling plant for bottles or the like, which is more and more realized in practice in order to achieve a reduction of costs, or even the subsequent incorporation into an existing filling plant is therefore much more difficult.

SUMMARY OF THE INVENTION

It is the object of the present invention to substantially reduce with the aid of simple means the amount of space required for a blow moulding machine of the type mentioned at the beginning.

Depending on the degree to which the blow wheel and the heating wheel overlap, the floor space of the blow moulding machine according to the present invention is reduced to a greater or lesser degree without impairing the function of the machine. The slight increase in the overall height does not have any negative effects at the locations where such blow moulding machines are normally installed. The smallest possible floor space is achieved when the blow wheel and the heating wheel cover each other completely and rotate preferably concentrically and directly on top of each other. This also results in a considerable reduction of the manufacturing costs due to a corresponding reduction of the number of components used for the machine frame.

BRIEF DESCRIPTION OF THE DRAWINGS

In the following, two embodiments of the present invention will be described making reference to the drawing, in which.

DETAILED DESCRIPTION OF THE PREFERRED EMBODIMENT

Figure 1:
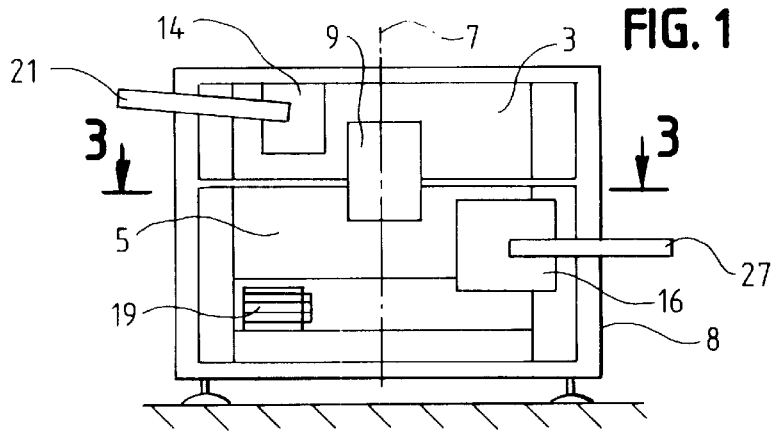
FIG. 1 shows a side view of a first embodiment of a blow moulding machine.
Figure 2:
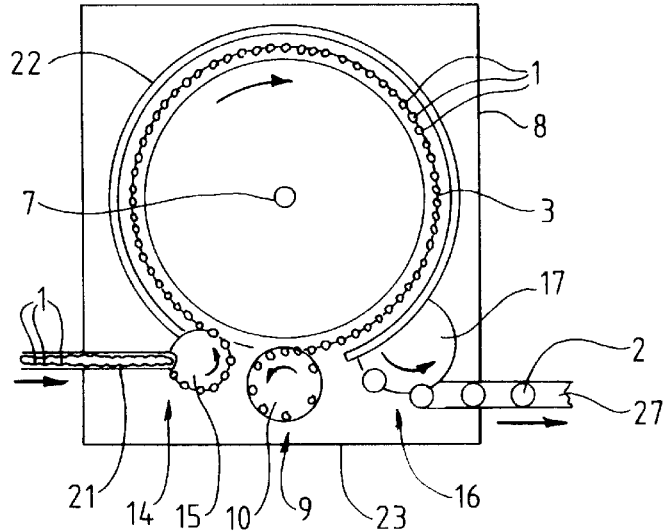
FIG. 2 shows a top view of the blow moulding machine according to FIG. 1.
Figure 3:
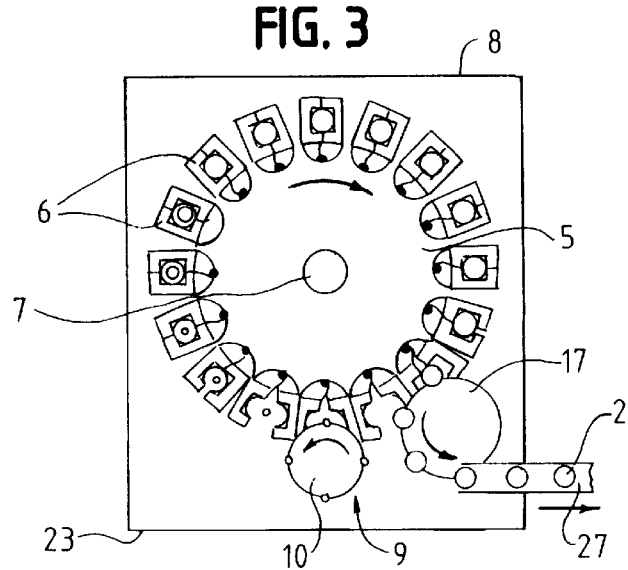
FIG. 3 shows section AA according to FIG. 1.

A blow moulding machine according to FIG. 1 to 5 is equipped for producing bottles 2 for beverages from injection-moulded preforms 1 consisting of a thermoplastic material, e.g. PET. It comprises a frame 8 composed of steel sections and having a boxlike basic shape, said frame 8 being provided with a perpendicular, hollow central column 18. This central column 18 has attached thereto a blow wheel 5 on a lower level and, on top of said blow wheel 5, a heating wheel 3 on an upper level, each of said wheels being rotatably supported on said central column. Hence, the heat of the heating wheel 3 can escape at the top unhindered. The heating wheel 3 and the blow wheel 5 have a common axis of rotation 7 and rotate in horizontal planes which are vertically displaced relative to each other. By means of a motor 19 and a transmission 20 comprising a plurality of gears, the heating wheel 3 and blow wheel 5 are driven in synchronism with each other, but at different speeds, in the direction of the arrow. The blow wheel 5 is fully covered by the heating wheel 3. The floor space of the frame 8 is therefore defined by the diameter of the heating wheel 3 or of the blow wheel 5 alone, depending on which of the two wheels is larger. The floor space is essentially one half of that of a conventional blow moulding machine in which the blow wheel and the heating wheel are arranged side by side.

The heating wheel 3 includes on its circle T a plurality of uniformly distributed rotatable reception means 4 for the preforms 1 which are oriented such that their openings are directed downwards, said reception means 4 being implemented as expansions arbors which are adapted to be controlled by a stationary lifting cam path means 37. At the rotary path of said expansion arbors, stationary heating and cooling stations 22 are arranged by means of which the preforms 1 are heated to processing temperature during their rotation with the heating wheel 3, said heating wheel 3 additionally causing said preforms 1 to spin about their own axis.

In the left area of the operating side 23 of the frame 8, a supply device 14 for the preforms 1 is provided on the upper level of the heating wheel 3. This supply device 14 essentially consists of a downwardly inclined guide groove 21 for the preforms 1, whose fully formed opening is provided with a support ring and faces upwards, and of a turning wheel 15 following said guide groove 21. This turning wheel 15 is driven by the transmission 20 in synchronism with the heating wheel 3 in the direction of the arrow. It takes over the preforms 1 at the normal position, if desired after separation by a screw conveyor which is not shown, by means of controllable grippers, rotates said preforms 1 by 180° about their transverse axis and introduces them, with the openings facing downwards, into the reception means 4 of the heating wheel 3, where they are fixed by the controllable expansion arbors of said reception means.

The blow wheel 5 includes on its circle t a plurality of uniformly distributed, conventional blow stations 6 for finish blowing the hollow bodies 2 making use of the heated preforms 1. Each blow station 6 has a divided blow mould 24 which is adapted to be opened, a cam-controlled stretching rod 25 for mechanically prestretching the preforms 1 and a blow mandrel 26 for receiving the openings of the preforms 1 in a gas-tight manner and for supplying the blowing air. The blow moulds 24 are opened by a cam control means 40 in the usual way in the reception and discharge area of the preforms 1 and closed and locked in the actual deformation area.

In the right area of the operating side 23 of the frame 8, a discharge device 16 for the finished hollow bodies 2 is provided on the lower level of the blow wheel 5. This discharge device essentially consists of a horizontal air conveyor 27, in which the hollow bodies 2 are suspended via their support ring, and of a turning wheel 17 preceding said air conveyor. This turning wheel is driven by the transmission 20 in synchronism with the blow wheel 5 in the direction of the arrow. It takes over the bottles 2, whose openings are directed downwards, from the open blow moulds 24 by means of controllable grippers, rotates them by 180° about their transverse axis and introduces them into the air conveyor 27. Subsequently, the bottles 2 are transported e.g. to a filling and closing machine, which is not shown, and filled with a beverage.

In the central area of the operating side 23 of the frame 8, a transfer device 9 for the preforms 1 is provided between the supply device 14 and the discharge device 16, said transfer device 9 extending over the upper level of the heating wheel 3 and the lower level of the blow wheel 5.

The transfer device 9 takes over the preforms 1, which are turned upside down, from the reception means 4 of the heating wheel 3, lowers them to the level of the blow wheel 5, while maintaining their vertical position, and supplies them to the blow mandrels 26 of the blow stations 6. During the transfer the spacing of the preforms 1—i.e. the distance between the central axes of two neighbouring preforms 1, measured on their path of movement—is enlarged from the smaller spacing on the circle T of the heating wheel 3 to the larger spacing on the circle t of the blow wheel 5, the distance between the larger circle T of the heating wheel 3 and the smaller circle t of the blow wheel 5 is bridged, and the speed of the preforms 1 corresponding to the much lower speed of the heating wheel 3 is increased so as to be adapted to the speed of the blow wheel 5 which rotates at a much higher speed. The heated preforms 1 are therefore transferred carefully and reliably from the heating wheel 3 to the blow wheel 5 on a comparatively short path; in so doing, an additional treatment can be carried out, if necessary, by heating elements, cooling elements, or similar elements— neither of these elements being shown—or protection against heat losses can be provided.

The transfer device 9 has a rotor 10 with a vertical axis of rotation, said rotor 10 being adapted to be rotated in the direction of the arrow, i.e. in a direction of rotation opposite to that of the heating wheel 3 and the blow wheel 5, by means of the transmission 20 in synchronism with said heating wheel 3 and said blow wheel 5. The cagelike rotor 10 is provided with two groups of holders, comprising each six holders in the form of resilient snap grippers for the area of the openings of the preforms 1. The first group of holders 13 is supported on the top plate 28 of the rotor such that said holders are pivotable in a horizontal plane, whereas the second group of holders 11 is guided in a vertically displaceable manner on rod-shaped guide means 12 which are arranged on a conical surface disposed concentrically with the axis of rotation of the rotor 10. The pivotal movement of the holders 13 is controlled by a stationary cam path means 29 in a cam disk 30, which is engaged by the holders 11 via roller followers 31. The lifting motion of the holders 11 is controlled by a stationary lifting cam path means 32 in a conical cam body 33, said stationary lifting cam path means 32 being engaged by the holders 11 via follower rolls 34. The cam disk 30 and the cam body 33 are arranged within the rotor 10 and are connected to the frame 8 such that they are secured against rotation relative thereto, whereas the rotor 10 is rotatably supported on said frame 8.

Figure 4:
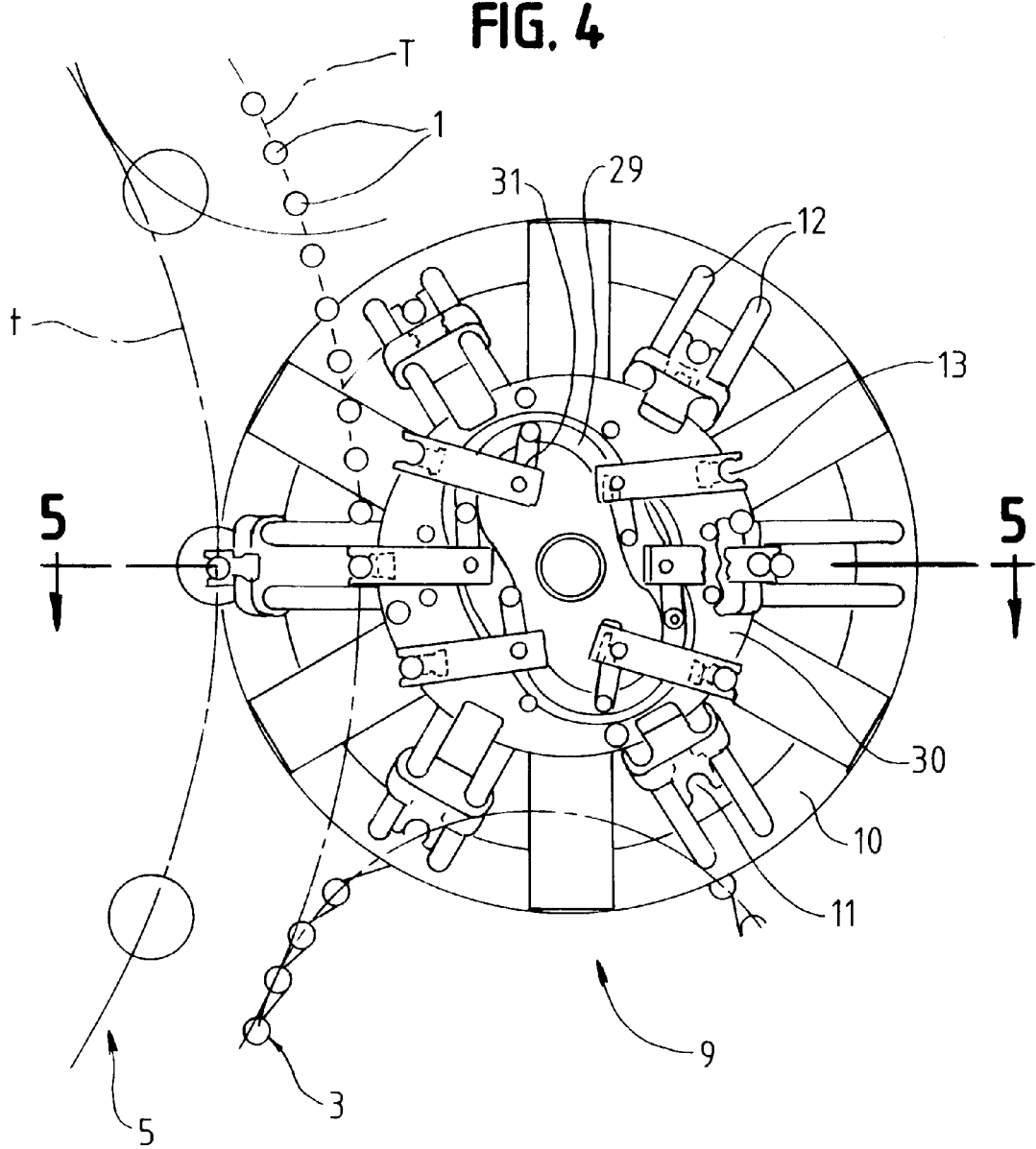
FIG. 4 shows an enlarged top view of the transfer device of the blow moulding machine according to FIG. 1 to 3.

As can especially be seen in FIG. 4, the paths of movement of the upper holders 13 overlap those of the lower holders 11 on their rotary path side which is remote from the heating wheel 3 and the blow wheel 5. The upper holders cause a high percentage of the enlargement of the spacing and the acceleration of the preforms without any vertical movement, whereas the lower holders 13 bring about the whole vertical movement and effect simultaneously, due to the conical path of movement, an enlargement of the spacing and an increase in speed to the amount predetermined by the blow wheel 5. A control of the holders 11 and 13 with regard to their gripping function is not absolutely necessary, since said holders are provided with resilient gripping tongs which open automatically when they are pushed onto and drawn off a preform 1. It may, however, be expedient to implement the upper and/or lower holders 13, 11 such that they are radially displaceable with the aid of a further cam control means 39 so as to facilitate the transfer between and the taking over from the individual reception means 4 as well as the transfer to the blow mandrels 26. As can be seen in FIG. 4, the transfer between the individual holders 11, 13 takes place on the upper level of the heating wheel 3. Subsequently, the holders 11 start their lowering movement to the level of the blow wheel and their approach to the circle t of said blow wheel.

Figure 5:
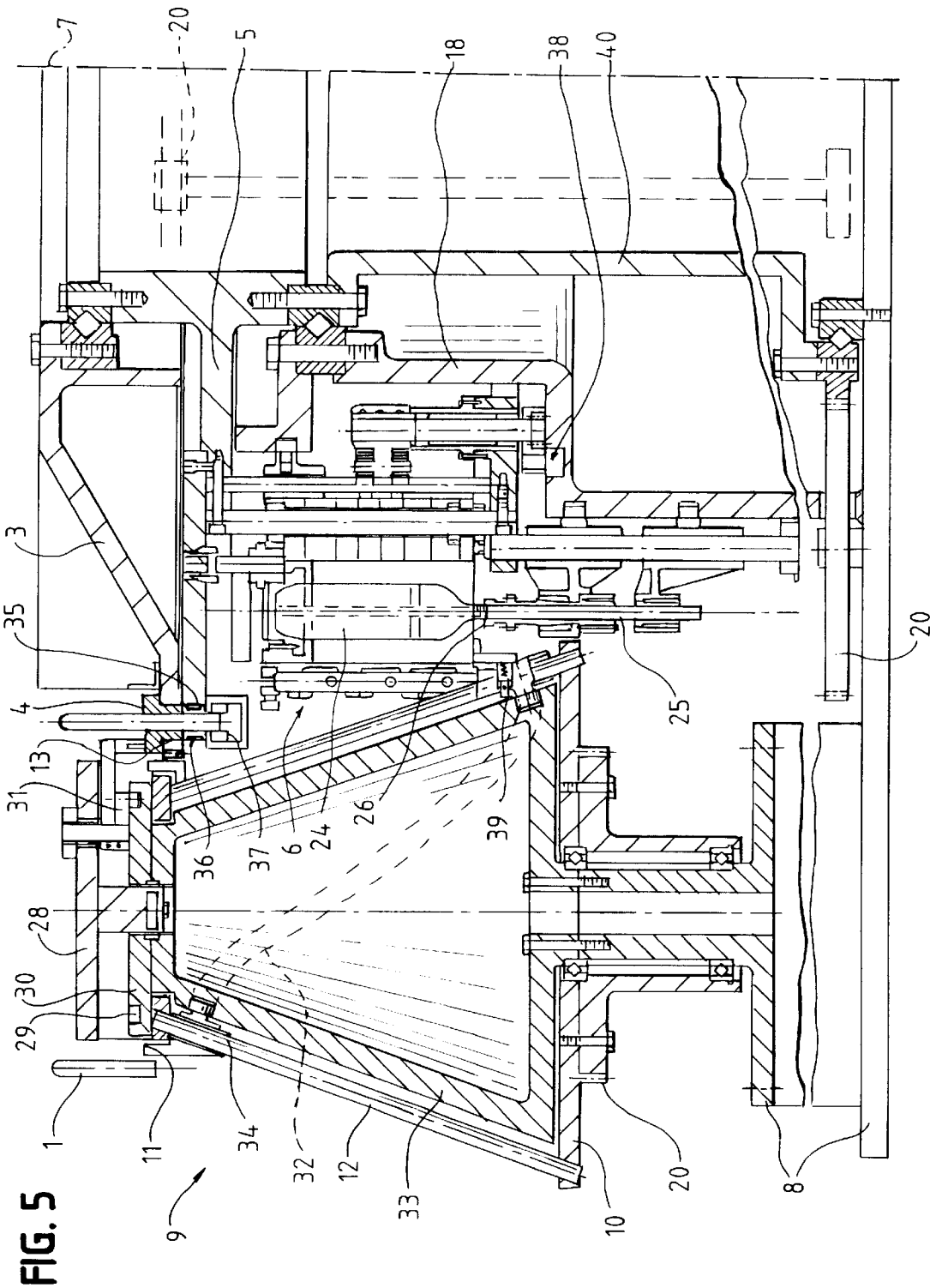
FIG. 5 shows section BB according to FIG. 4.
Figure 6:
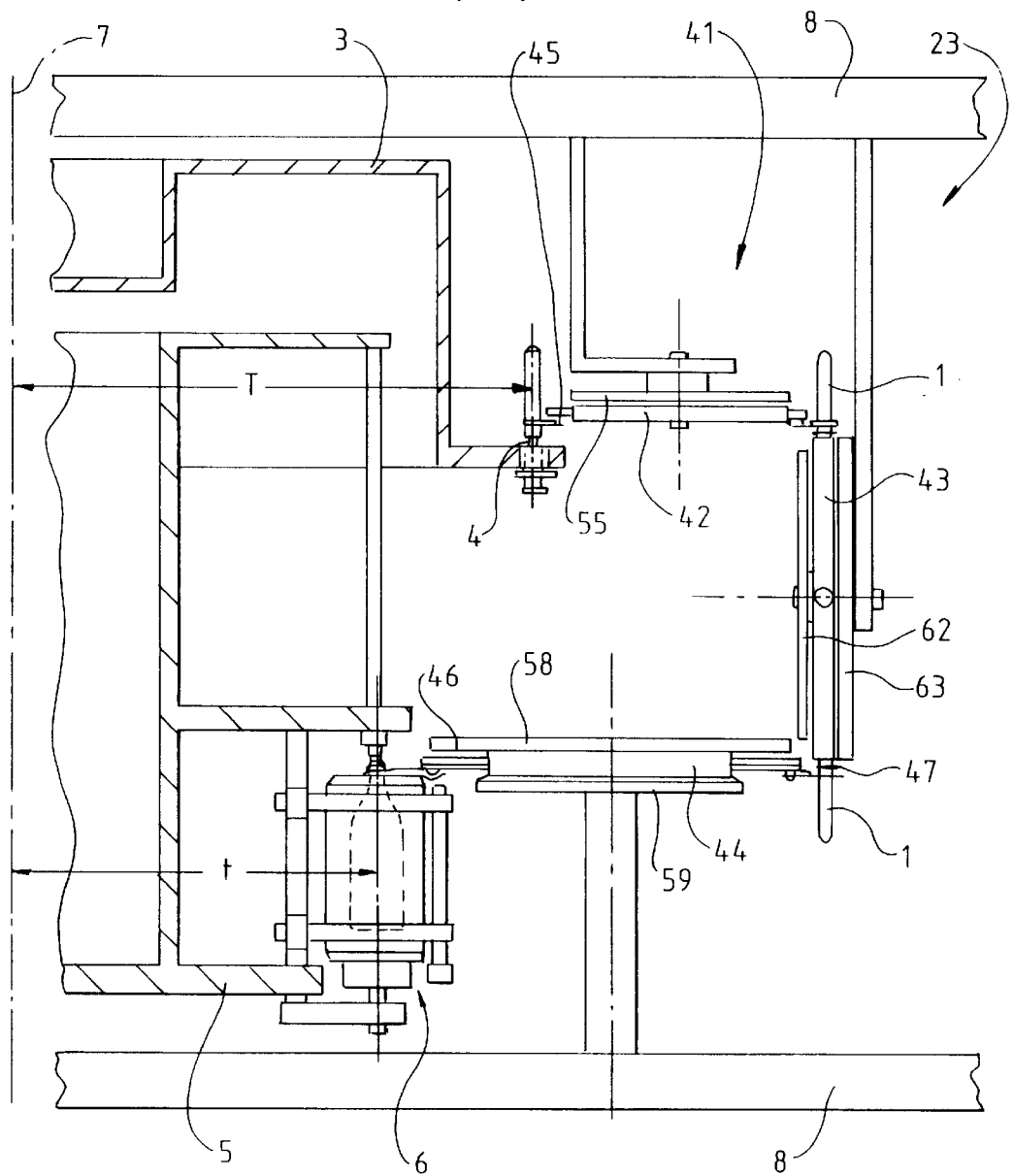
FIG. 6 shows a vertical section through a second embodiment of a blow moulding machine in the area of the transfer device.
Figure 7:
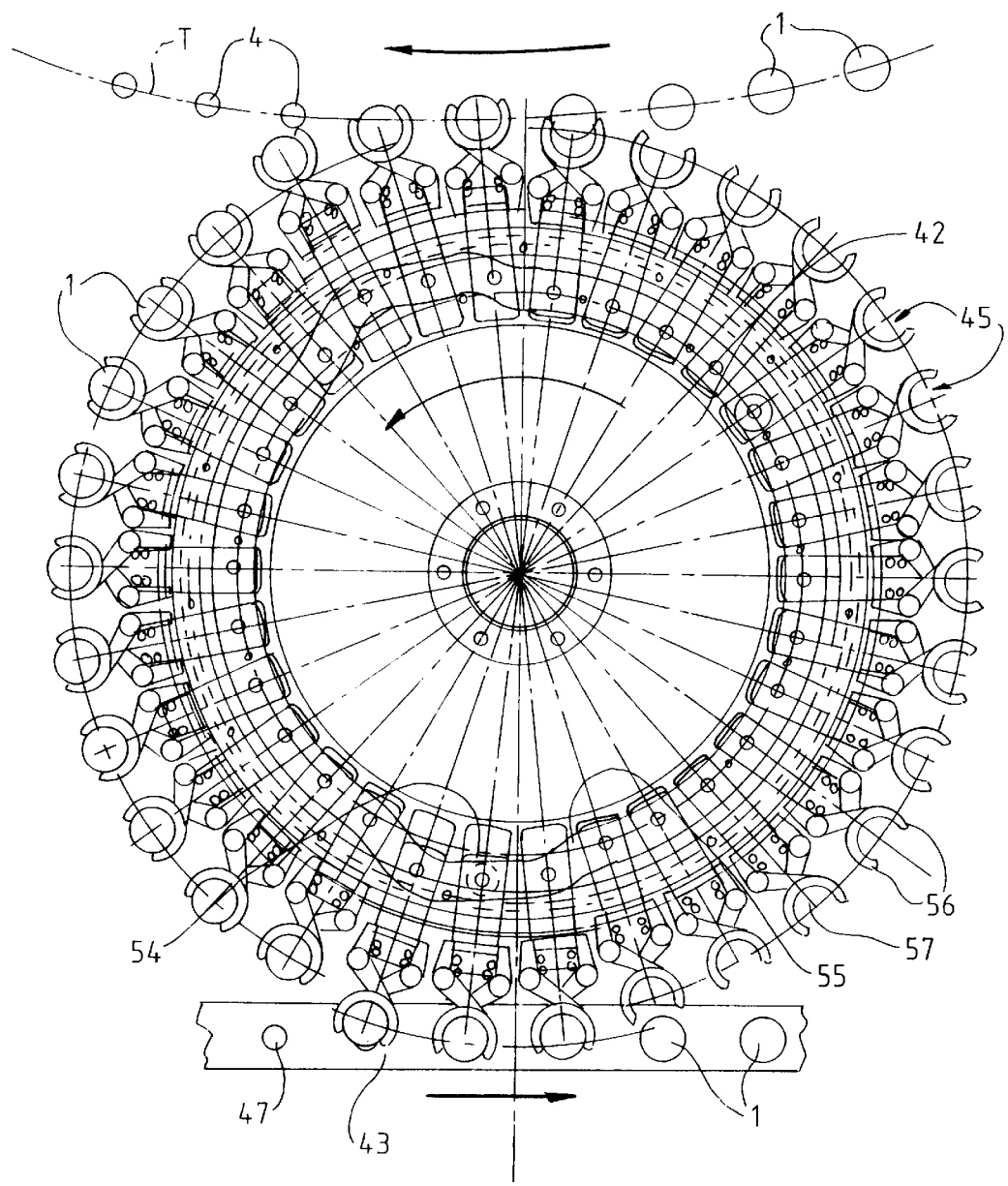
FIG. 7 shows a top view of the upper rotor of the transfer device according to FIG. 6.
Figure 8:
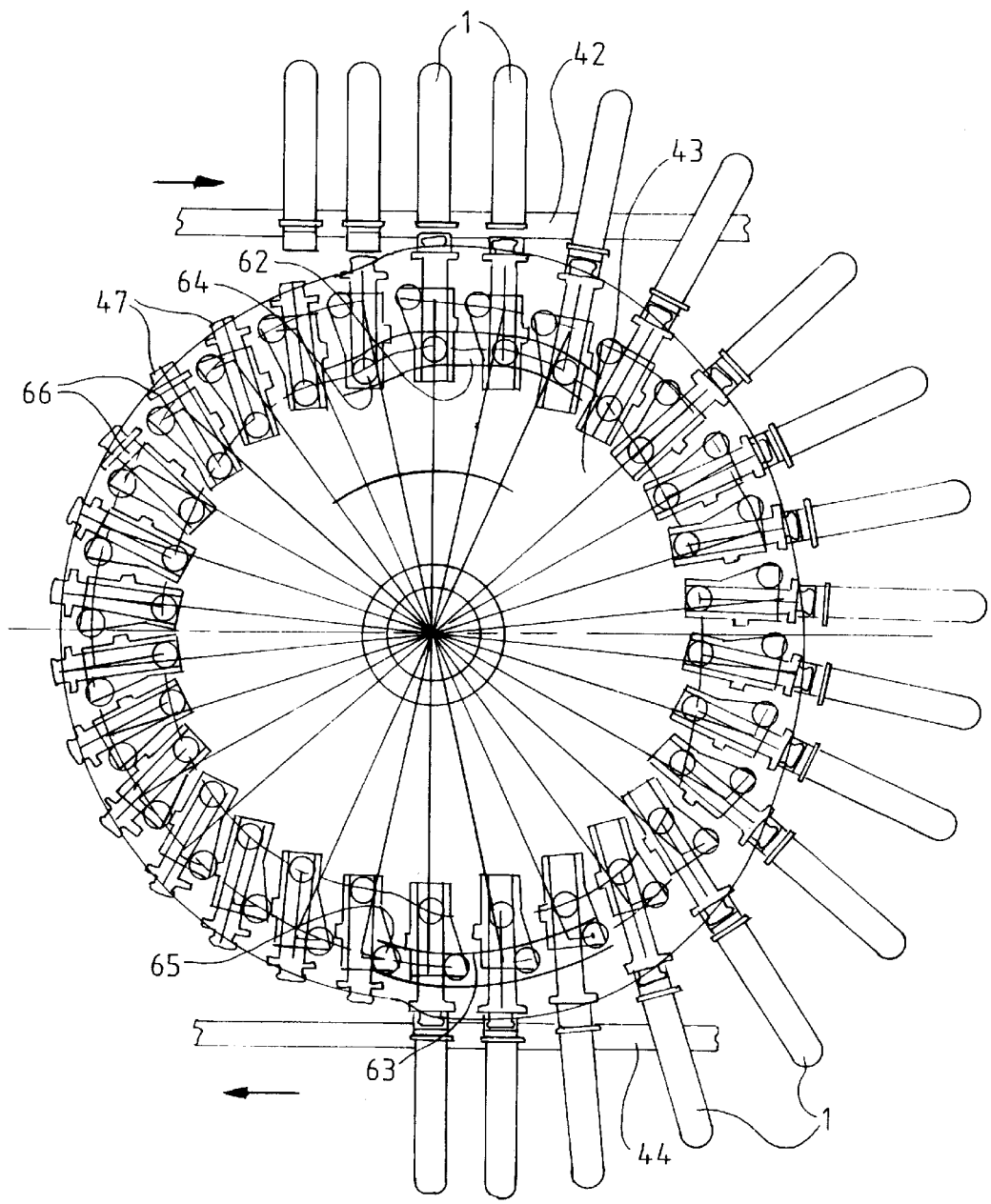
FIG. 8 shows the side view of the central rotor of the transfer device according to FIG. 6.

As can especially be seen from FIG. 5, the blow wheel 5 is secured to a hollow shaft 40 which is rotatably supported on the frame 8 or rather on the hollow central column 18 of said frame 8 by means of two roller bearings. The outer side of the central column 18 is provided with stationary control cams for the cam control means 38, for the vertical movement of the blow mandrels 26, the stretching rods 25, the bottom member of the blow moulds 24 etc.

The heating wheel 3 is rotatably supported at the upper end of the blow wheel 5 or rather the hollow shaft 40 of said blow wheel 5 by means of a further roller bearing so that the heating wheel 3 and the blow wheel 5 can rotate independently of one another about the common vertical axis of rotation 7.

The blow wheel 5 is driven by the transmission 20 via teeth arranged at the lower end of the hollow shaft 40; the heating wheel 3 is driven via teeth formed on the outer boundary thereof by means of a gear and a substantially vertical shaft of the transmission 20.

In the upper area of the blow wheel 5, a toothed rim 35, which is concentric with the axis of rotation 7, is secured in position directly below the heating wheel 3. This toothed rim 35 is in mesh with pinions 36, each of said pinions being 36 being secured to a reception means 4 of the heating wheel 3 such that it is secured against rotation relative thereto. The reception means 4 are, in turn, rotatably supported in the heating wheel 3 such that they are adapted to be rotated about axes which extend parallel to the axis of rotation 7. In view of the different speeds of the blow wheel 5 and the heating wheel 3, the toothed rim 35 and the pinions 36 act as a planetary gearing which causes the reception means 4 to spin about their own axis when the blow moulding machine is in operation. This is necessary so as to permit a uniform heating of the preforms 1 by the heating and cooling stations 22.

The supply of the operating media, such as cooling water, pressurized air, and the like, to the blow stations 6 is effected by means of rotary distributors in the interior of the heating wheel 3, which are not shown, and by means of passages which extend radially outwards in said heating wheel 3 and which are not shown either.

The blow moulding machine according to FIG. 6 to 10 comprises a frame 8 within which a heating wheel 3 and, below said heating wheel 3, a blow wheel 5 rotate in vertically displaced, horizontal planes about a common vertical axis of rotation 7. The heating wheel 3 includes on its circle T a plurality of uniformly distributed, rotatable reception means 4 for the preforms 1, at the rotary path of which stationary heating and cooling stations, not shown, are arranged. The blow wheel 5 includes on its circle t a plurality of uniformly distributed blow stations 6 for finish blowing the hollow bodies making use of the heated preforms 1.

In the central area of the operating side 23 of the frame 8, a transfer device 41 for the preforms 1 is provided between the supply device 14 used for supplying the preforms 1 to the heating wheel 3 and the discharge device 16 used for discharging the finished hollow bodies from the blow wheel 5, said transfer device 41 extending from the upper level of the heating wheel 3 to the lower level of the blow wheel 5. The transfer device 41 takes over the preforms 1, which are turned upside down, from the reception means 4 of the heating wheel 3, lowers them to the level of the blow wheel 5 while turning them by 180°, and supplies them to the blow stations 6 of said blow wheel 5 in which the hollow bodies or bottles are finished while occupying their upright normal position. During the transfer the spacing of the preforms 1 is additionally enlarged from the smaller spacing on the circle T of the heating wheel 3 to the larger spacing on the circle t of the blow wheel 5, the distance between the larger circle T of the heating wheel 3 and the smaller circle t of the blow wheel 5 is bridged, and the speed of the preforms 1 corresponding to the much lower speed of the heating wheel 3 is increased so as to be adapted to the speed of the blow wheel 5 which rotates at a higher speed. The heated preforms 1 are therefore transferred carefully and reliably from the heating wheel 3 to the blow wheel 5 on a short path; in so doing, an additional treatment can be carried out, if necessary, by heating elements, cooling elements, or similar elements—neither of these elements being shown—or protection against heat losses can be provided and/or the preforms 1 can be caused to spin about their own axis.

The transfer device 41 comprises a total of three disk-shaped rotors 42, 43, 44, which are functionally connected in series and which are driven in synchronism with one another as well as in synchronism with the heating wheel 3 and the blow wheel 5.

The upper rotor 42 rotates on the level of the heating wheel 3 in a horizontal plane in the opposite direction of rotation. The circumference of said rotor is provided with a plurality of uniformly distributed gripping tongs 45 which are supported in a radially displaceable manner. Said gripping tongs 45 each engage by means of a follower roll 54 a stationary, closed-loop cam path means 55 which controls the relative movement or relative position of the gripping tongs 45 during a rotation of the rotor 42. The gripping tongs 45 themselves each have two gripping arms 56 which are pivotable like the arms of a pair of scissors and which are spring-loaded in the closing direction under the influence of springs 57. The ends of the gripping arms 56 are bevelled so that, when pushed onto or drawn off a preform 1, the gripping arms will open and close automatically.

Figure 9:
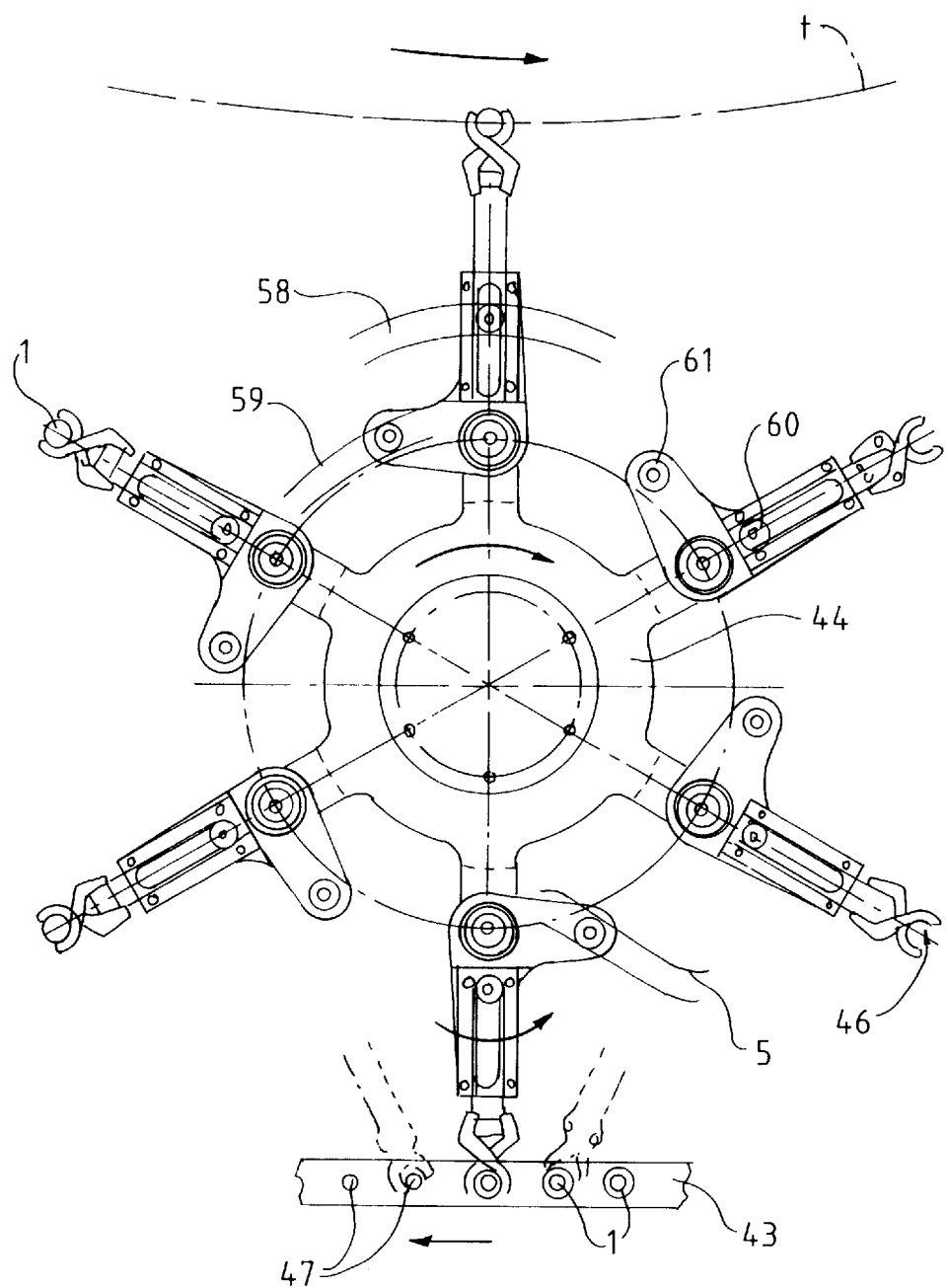
FIG. 9 shows the top view of the lower rotor of the transfer device according to FIG. 6.

The lower rotor 44 rotates on the level of the blow wheel 5 in a horizontal plane in the opposite direction of rotation. Said lower rotor 44 has a diameter which is larger than that of the upper rotor 42 and, like said upper rotor 42, it is equipped with gripping tongs 46 provided on the circumference thereof, the number of said gripping tongs 46 being, however, not as high as in the case of the upper rotor 42. The gripping tongs 46 are supported in bent levers 53 such that they are substantially radially displaceable, said bent levers being, in turn, pivotably supported on the rotor 44. The radial movement and the pivotal movement of the gripping tongs 46 is controlled by two separate, closed-loop stationary cam path means 58, 59 which are engaged by follower rolls 60, 61 secured to the bent levers 53 and the gripping tongs 46, respectively. In FIG. 9, the bent levers 53 and the gripping tongs 46 are shown at their radial central positions at which the spacing of the gripping tongs 46 corresponds to the spacing of the blow stations 6 on the blow wheel 5. The gripping tongs 46 can be moved relatively with the aid of the two cam path means 58, 59 when the rotor 44 rotates, whereby the spacing as well as the speed of said gripping tongs 46 will be changed and their gripping movement will be controlled. The position at which two gripping tongs 46 have been moved towards one another for taking over the preforms 1 from the central rotor 43 is indicated by a dot-and-dash line.

The central rotor 43 rotates between the level of the heating wheel 3 and the level of the blow wheel 5 in a vertical plane, the upper area of rotation of said rotor 43 touching the outer area of rotation of the upper rotor 42 and the lower area of rotation of said rotor 43 touching the outer area of rotation of the lower rotor 44. The direction of rotation of the central rotor 43 is such that, in the touching areas of rotation, the rotary movement of said central rotor 43 corresponds to that of the upper rotor 42 and to that of the lower rotor 44, respectively, the heating wheel 3 and blow wheel 5 rotating in opposite directions of rotation.

The central rotor 43 is provided with holding mandrels 47 which are uniformly arranged on the cicumference thereof and which are supported such that they are pivotable as well as substantially radially displaceable. With the aid of two stationary, closed-loop cam path means 62, 63, which are engaged by follower rolls 64, 65 connected to the holding mandrels 47, the movement and the position of said holding mandrels 47 is controlled during rotation of the central rotor 43. The holding mandrels 47 are adapted to the interior diameter of the preforms 1 so as to reliably fix said preforms 1 by means of frictional engagement.

The structural design of said stationary cam path means 55, 58, 59, 62 and 63 is of such a nature that the above-described function of the transfer device 41 is obtained; the three rotors 42, 43, 44 rotate continuously, so do the heating wheel 3 and the blow wheel 5. The radial movement of the gripping tongs 45 of the first rotor 42 serve to take hold of the preforms 1 on the reception means 4 of the heating wheel 3 and to carry out an adaptation to the rotary path of the holding mandrels 47 of the central rotor 43. The pivoting and lifting motions of the holding mandrels 47 of the central rotor 43 serve to introduce the holding mandrels 47 into the preforms 1 still held by the gripping tongs 45 and to remove the holding mandrels 47 from the preforms 1 which have already been taken hold of by the gripping tongs 46 of the lower rotor 44. The pivoting and lifting motions of the gripping tongs 46 of the lower rotor 44, however, serve to accelerate the preforms 1 and to enlarge the spacing between them so as to match the higher speed of the blow wheel 5 and its larger spacing corresponding to the spacing of the blow stations 6. During the whole transfer, the heated preforms 1 are grasped from the outside or from the inside exclusively in the comparatively cold area above the support ring and they are alway fixed precisely by means of positive and/or frictional engagement.

If necessary, the preforms 1 can be rotated in the area of the central rotor 43 by supporting the holding mandrels 47 such that they are adapted to be rotated about their central axes and by causing them to rotate by means of friction wheels 66. A deformation of the preforms 1 during the 180° pivotal movement in the area of the central rotor 43 is reliably counteracted in this way. The friction wheels 66 act on the lateral surface of a stationary disk having the cam path means 63 formed therein.

Figure 10:
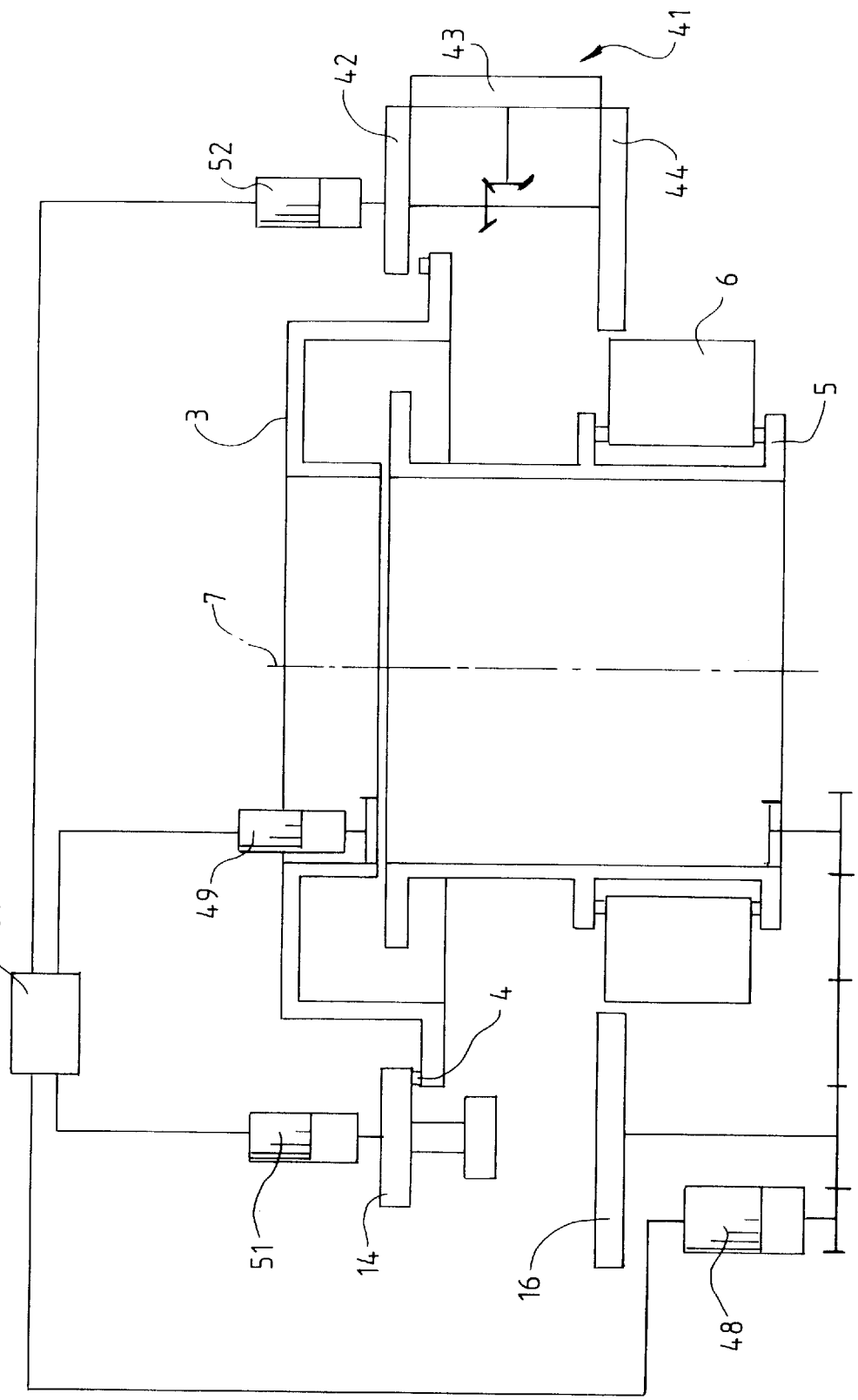
FIG. 10 shows the schematic representation of the blow moulding machine according to FIG. 6 to 9.

As can be seen in FIG. 10, the blow moulding machine described hereinbefore is driven by a total of four frequency-controlled synchronous motors. The first synchronous motor 48 drives the blow wheel 5 and the discharge device 16; the second synchronous motor 49 drives the heating wheel 3; the third synchronous motor 51 drives the supply device 14; the fourth synchronous motor 52 drives the transfer device 41.

All synchronous motors 48, 49, 51, 52 are provided with rotors with strongly permanently excited poles, the magnetic materials used being highly permeable materials. The resultant high remanent flux density permits very high synchronous torques with a substantial overload capacity. The synchronous motors 48, 49, 51, 52 are electrically coupled on their input side in a power-failure-safe manner. Due to this connection, it is guaranteed that the motors coast in synchronous angles even in the case of power failure.

The rotating field for driving the synchronous motors 48, 49, 51, 52 originates from a common frequency converter 50 at which the desired speed for driving the blow moulding machine is adjusted. The adjusting range of the output frequency of the frequency converter 50 ranges from 0 hertz to e.g. 120 hertz.

When the above-described multi-motor drive of a blow moulding machine having a single frequency converter is used, many conventional transmission elements are no longer necessary on the one hand and a complicated electronic control for the synchronous operation of the motors can be dispensed with on the other. Hence, said multi-motor drive contributes to a particularly compact and enconomy-priced structural design of a blow moulding machine according to the present invention.

What is claimed is:

1. A blowing moulding machine comprising in combination a heating wheel (3) provided with a plurality of reception means (4) for preforms (1) and having a substantially vertical axis of rotation, a blow wheel (5) provided with a plurality of blow stations (6) for hollow bodies (2) and having a substantially vertical axis of rotation, and said heating wheel (3) and said blow wheel (5) are arranged on different levels and overlap each other at least partially.

2. A blow moulding machine according to claim 1, wherein said heating wheel (3) is arranged on a higher level than said blow wheel (5) and covers said blow wheel (5) essentially completely.

3. A blow moulding machine according to claim 1 or 2, wherein said heating wheel (3) and said blow wheel (5) are arranged concentrically.

4. A blow moulding machine according to claim 1 or 2, wherein said heating wheel (3) and said blow wheel (5) are adapted to be driven synchronously in the same direction of rotation and at different speeds.

5. A blow moulding machine according to claim 1 or 2, wherein said heating wheel (3) has a larger diameter than said blow wheel (5).

6. A blow moulding machine according to claim 1, wherein said heating wheel (3), and said blow wheel (5) are arranged in a common frame (8).

7. A blow moulding machine according to claim 1 or 2, wherein said spacing of said reception means (4) of said heating wheel (3) is smaller than the spacing of said blow stations (6) of said blow wheel (5).

8. A blow moulding machine according to claim 1, and a transfer device (9) by means of which the preforms (1) are transferred from the level of said heating wheel (3) to the level of said blow wheel.

9. A blow moulding machine according to claim 8, wherein said transfer device (9) enlarges the spacing of the preforms.

10. A blow moulding machine according to claim 8 wherein said transfer device (9) comprises a rotor (10) whose axis of rotation extends substantially parallel to the axis of rotation (7), of said heating wheel (3) and of said blow wheel (5), said rotor (10) being adapted to be driven in synchronism with said heating wheel (3) and said blow wheel (5) and in a direction of rotation opposite to that of said heating and blow wheels.

11. A blow moulding machine according to claim 10, wherein said rotor (10) is equipped with holders (11) for the preforms, said holders (11) being vertically movable in a controlled manner.

12. A blow moulding machine according to claim 11, wherein said vertically movable holders (11) are supported on guide means (12) which are arranged on a conical surface disposed concentrically with the axis of rotation of said rotor (10).

13. A blow moulding machine according to claim 10, 11 or 12, wherein said rotor (10) is equipped with holders (13) for the preforms, said holders (13) being adapted to be pivoted in the direction of rotation in a controlled manner.

14. A blow moulding machine according to claim 8, and wherein a supply device (14) for the preforms is provided on the rotary path of said heating wheel (3) in front of said transfer device (9).

15. A blow moulding machine according to claim 14, wherein said supply device (14) is provided with a turning wheel (15) which takes over the preforms at an upright normal position, pivots them by 180°, and transfers them to said reception means (4) of said heating wheel (3) such that the openings of said preforms are directed downwards.

16. A blow moulding machine according to claim 8, and wherein a discharge device (16) for the finished hollow bodies is arranged on the rotary path of said blow wheel (5) after said transfer device (9).

17. A blow moulding machine according to claim 16, wherein said discharge device (16) is provided with a turning wheel (17) which removes the finished hollow bodies from said blow stations (6) with the openings of said hollow bodies facing downwards, turns them by 180°, and discharges them at an upright normal position.

18. A blow moulding machine according to claim 14, wherein said transfer device (9) is arranged between said supply device (14) and a discharge device (16).

19. A blow moulding machine according to claim 6, wherein said blow wheel (5) is rotatably supported on said frame (8) such that said heating wheel (3) is rotatably supported on said blow wheel (5).

20. A blow moulding machine according to claim 19, wherein said blow wheel (5) has formed thereon a toothed rim (35) engaged by pinions (36) which are connected to said rotatable reception means (4) of said heating wheel (3) such that they are secured against rotation relative thereto.

21. A blow moulding machine according to claim 8, wherein said transfer device (41) comprises at least three rotors (42, 43, 44) which are connected in series and which are adapted to be driven in synchronism with one another, said first rotor (42) taking the preforms over from said heating wheel (3), said last rotor (44) transferring the preforms to said blow wheel (5) and each said intermediate rotor (43) changing the level of the preforms at least partially.

22. A blow moulding machine according to claim 21, wherein said first rotor (42) rotates on the level of said heating wheel (3) in a substantially horizontal plane, that said last rotor (44) rotates on the level of said blow wheel (5) in a substantially horizontal plane, and that each said intermediate rotor (43) rotates in a substantially vertical plane.

23. A blow moulding machine according to claim 21, wherein said first (42) and said last rotor (44) are provided with gripping tongs (45, 46) and that at least one said intermediate rotor (43) is provided with holding mandrels (47) for the preforms.

24. A blow moulding machine according to claim 23, wherein said gripping tongs (45, 46) and said holding mandrels (47) are adapted to carry out controlled movements in the rotary plane of their respective said rotor (42, 43, 44) and relative to said respective rotor (42, 43, 44).

25. A blow moulding machine according to claim 24, wherein said gripping tongs (45) of said first rotor (42) are supported in a radially displaceable manner.

26. A blow moulding machine according to claim 24, wherein said gripping tongs (46) of said last rotor (44) are supported such that they are radially displaceable and pivotable.

27. A blow moulding machine according to claim 24, 25, or 26, wherein said holding mandrels (47) of a said intermediate rotor (43) are supported such that they are radially displaceable and pivotable.

28. A blow moulding machine according to claim 9 or 21, wherein the enlargement of the spacing of the preforms is predominantly carried out by said last rotor (44).

29. A blow moulding machine according to claim 1, wherein said heating wheel (3) and said blow wheel (5) are each driven by a separate frequency-controlled synchronous motor (48, 40) and said synchronous motors (48, 49) are connected to a common frequency converter (50).

30. A blow moulding machine according to claim 29, wherein a supply device (14), a discharge device (16), and a transfer device (41) are each driven by a separately frequency-controlled synchronous motor (51, 52), and said synchronous motors (51, 52) are connected to said common frequency converter (50).

31. A blow moulding machine according to claim 29 or 30, wherein the frequency adjustment range of said common frequency converter (50) reaches down to 0 hertz.

32. A blow moulding machine according to claim 23 or 24, wherein said holding mandrels (47) are adapted to be driven such that they rotate about their central axes.

33. A blow moulding machine according to claim 6, wherein said transfer device is arranged on the operating side of said frame (8).

34. A blow moulding machine according to claim 19, wherein said blow wheel is rotatably supported on a central column (18) connected to said frame (8).

* * * * *

UNITED STATES PATENT AND TRADEMARK OFFICE
CERTIFICATE OF CORRECTION

PATENT NO. : 6,152,723
DATED : November 28, 2000
INVENTOR(S) : Horst Winter & Karl Griesbeck It is certified that error appears in the above-identified patent and that said Letters Patent is hereby corrected as shown below:

<u>Claim 30,</u>
Line 3, "separately" should read -- separate --.

Signed and Sealed this

Twenty-fifth Day of September, 2001

*Attest:*

NICHOLAS P. GODICI
*Acting Director of the United States Patent and Trademark Office*

*Attesting Officer*